(12) United States Patent
Lutas

(10) Patent No.: US 10,635,479 B2
(45) Date of Patent: Apr. 28, 2020

(54) EVENT FILTERING FOR VIRTUAL MACHINE SECURITY APPLICATIONS

(71) Applicant: Bitdefender IPR Management Ltd., Nicosia (CY)

(72) Inventor: Andrei V. Lutas, Cluj-Napoca (RO)

(73) Assignee: Bitdefender IPR Management Ltd., Nicosia (CY)

(*) Notice: Subject to any disclaimer, the term of this patent is extended or adjusted under 35 U.S.C. 154(b) by 263 days.

(21) Appl. No.: 15/845,060

(22) Filed: Dec. 18, 2017

(65) Prior Publication Data

US 2018/0173555 A1 Jun. 21, 2018

Related U.S. Application Data

(60) Provisional application No. 62/436,027, filed on Dec. 19, 2016.

(51) Int. Cl.
*G06F 9/455* (2018.01)
*G06F 9/54* (2006.01)
(Continued)

(52) U.S. Cl.
CPC .......... *G06F 9/45558* (2013.01); *G06F 9/542* (2013.01); *G06F 21/53* (2013.01);
(Continued)

(58) Field of Classification Search
None
See application file for complete search history.

(56) References Cited

U.S. PATENT DOCUMENTS

| 5,075,845 A | * | 12/1991 | Lai | G06F 9/4488 711/152 |
| 7,124,327 B2 | * | 10/2006 | Bennett | G06F 11/0712 714/38.13 |

(Continued)

FOREIGN PATENT DOCUMENTS

WO 2015183116 A1 12/2015

OTHER PUBLICATIONS

No stated author; Intel® 64 and IA-32 Architectures Software Developer's Manual System Programming Guide, Part 3; 2016; retrieved from the Internet https://www.intel.com/; pp. 1-730, as printed. (Year: 2016).*

(Continued)

*Primary Examiner* — Saleh Najjar
*Assistant Examiner* — Michael W Chao
(74) *Attorney, Agent, or Firm* — Law Office of Andrei D Popovici, PC

(57) ABSTRACT

Described systems and methods allow protecting a hardware virtualization system from malicious software. Some embodiments use a hybrid event notification/analysis system, wherein a first component executing within a protected virtual machine (VM) registers as a handler for processor exceptions triggered by violations of memory access permissions, and wherein a second component executing outside the respective VM registers as a handler for VM exit events. The first component filters permission violation events according to a set of rules and only notifies the second component about events which are deemed relevant to security. The second component analyzes notified events to detect malicious software.

18 Claims, 8 Drawing Sheets

(51) Int. Cl.
*G06F 21/56* (2013.01)
*G06F 21/53* (2013.01)
*G06F 21/55* (2013.01)

(52) U.S. Cl.
CPC .......... *G06F 21/554* (2013.01); *G06F 21/566* (2013.01); *G06F 2009/45583* (2013.01); *G06F 2009/45587* (2013.01); *G06F 2009/45591* (2013.01)

(56) References Cited

U.S. PATENT DOCUMENTS

| | | | | |
|---|---|---|---|---|
| 7,797,747 | B1* | 9/2010 | Ferrie | G06F 21/562 726/22 |
| 8,225,317 | B1 | 7/2012 | Chiueh et al. | |
| 8,504,703 | B2 | 8/2013 | Vega et al. | |
| 8,966,623 | B2 | 2/2015 | Horovitz et al. | |
| 9,311,126 | B2 | 4/2016 | Edwards et al. | |
| 9,400,885 | B2* | 7/2016 | Tosa | G06F 21/554 |
| 9,965,313 | B2 | 5/2018 | Lukacs et al. | |
| 10,248,785 | B2* | 4/2019 | Tsirkin | G06F 9/45558 |
| 10,496,522 | B2* | 12/2019 | Merten | G06F 11/301 |
| 2005/0138256 | A1* | 6/2005 | Bolay | G06F 9/4812 710/260 |
| 2007/0157003 | A1* | 7/2007 | Durham | G06F 12/1475 711/206 |
| 2009/0241109 | A1* | 9/2009 | Vandegrift | G06F 9/445 718/1 |
| 2011/0197004 | A1* | 8/2011 | Serebrin | G06F 9/45558 710/267 |
| 2011/0219447 | A1 | 9/2011 | Horovitz et al. | |
| 2011/0258610 | A1* | 10/2011 | Aaraj | G06F 21/554 717/128 |
| 2012/0254993 | A1 | 10/2012 | Sallam | |
| 2012/0255004 | A1* | 10/2012 | Sallam | G06F 21/52 726/23 |
| 2013/0091568 | A1* | 4/2013 | Sharif | G06F 21/50 726/22 |
| 2013/0174147 | A1* | 7/2013 | Sahita | G06F 9/45558 718/1 |
| 2013/0297849 | A1* | 11/2013 | Wagner | G06F 12/10 711/6 |
| 2014/0068137 | A1* | 3/2014 | Kegel | G06F 12/1009 711/6 |
| 2014/0115652 | A1 | 4/2014 | Kapoor et al. | |
| 2014/0215226 | A1* | 7/2014 | Litty | G06F 21/53 713/193 |
| 2015/0013008 | A1* | 1/2015 | Lukacs | G06F 21/53 726/24 |
| 2015/0019765 | A1* | 1/2015 | Kegel | G06F 13/24 710/48 |
| 2015/0026807 | A1* | 1/2015 | Lutas | G06F 21/79 726/23 |
| 2015/0033227 | A1* | 1/2015 | Lin | G06F 21/55 718/1 |
| 2015/0121135 | A1* | 4/2015 | Pape | G06F 11/1484 714/15 |
| 2015/0121366 | A1 | 4/2015 | Neiger et al. | |
| 2015/0199514 | A1* | 7/2015 | Tosa | G06F 21/554 726/17 |
| 2015/0378633 | A1* | 12/2015 | Sahita | G06F 9/45558 711/163 |
| 2015/0379263 | A1 | 12/2015 | Vipat et al. | |
| 2015/0379265 | A1* | 12/2015 | Lutas | G06F 21/55 726/23 |
| 2016/0021142 | A1 | 1/2016 | Gafni et al. | |
| 2016/0048679 | A1 | 2/2016 | Lutas et al. | |
| 2016/0179696 | A1 | 6/2016 | Zmudzinski | |
| 2016/0224786 | A1* | 8/2016 | Swidowski | H04L 63/1416 |
| 2016/0224792 | A1 | 8/2016 | Dalcher et al. | |
| 2017/0249260 | A1* | 8/2017 | Sahita | G06F 12/145 |
| 2017/0371733 | A1* | 12/2017 | Rugina | G06F 3/0659 |
| 2019/0377639 | A1* | 12/2019 | Gschwind | G06F 3/0629 |

OTHER PUBLICATIONS

European Patent Office, International Search Report and Written Opinion dated Mar. 13, 2018 for PCT International Application No. PCT/EP2017/083579, international filing date Dec. 19, 2017, priority date Dec. 19, 2016.

* cited by examiner

EVENT FILTERING FOR VIRTUAL MACHINE SECURITY APPLICATIONS

RELATED APPLICATIONS

This application claims the benefit of the filing date of U.S. provisional patent application No. 62/436,027, filed on Dec. 19, 2016, entitled "Event Filter for Accelerating Computer Security Operations in Virtual Machines", the entire contents of which are incorporated by reference herein.

BACKGROUND

The invention relates to computer security systems and methods, and in particular to systems and methods for protecting virtual machines against malicious software.

Malicious software, also known as malware, affects a great number of computer systems worldwide. In its many forms such as computer viruses, rootkits, spyware, and ransomware, malware presents a serious risk to millions of computer users, making them vulnerable to loss of data and sensitive information, identity theft, and loss of productivity, among others. Computer security software may be used to protect a computer system from malware.

Hardware virtualization technology enables the creation of simulated computer environments commonly known as virtual machines (VM), which behave in many ways as physical computer systems. In typical applications such as server consolidation and infrastructure-as-a-service (also know under the popular name "cloud computing"), several virtual machines may run simultaneously on the same computer system, sharing hardware resources among them, thus reducing investment and operating costs. Each virtual machine may run its own operating system and/or software applications, separately from other virtual machines. Each such VM potentially requires protection against computer security threats.

Placing computer security software outside the protected virtual machine typically ensures a high degree of protection. However, the operation of computer security software is substantially more complex and computationally expensive when carried out in such configurations, compared to non-virtualized environments. In conventional hardware virtualization anti-malware systems, security-relevant events occurring within the protected VM typically cause the hardware processor to suspend execution of the respective VM, and to switch to executing security software outside the protected VM. The processor may then switch back to executing the protected VM in response to event analysis. Frequent VM suspend/resume cycles carry a substantial computational cost, and may affect productivity and user experience.

There is a substantial interest in improving the efficiency of computer security operations in hardware virtualization platforms.

SUMMARY

According to one aspect, a host system comprises a hardware processor and a memory. The hardware processor is configured to execute a virtual machine (VM), an event filter, and an introspection engine, the event filter executing within the VM, the introspection engine executing outside of the VM. The hardware processor is further configured to generate a first exception in response to detecting an attempt by a software entity executing within the VM to access a memory location in a manner which violates a memory access permission, and in response to the first exception, to switch from executing the software entity to executing the event filter. The hardware processor is further configured, in response to a second exception, to switch from executing the event filter to executing the introspection engine. The event filter is configured, in response to the first exception, to determine according to an event eligibility criterion whether the attempt is eligible for notification to the introspection engine. The event filter is further configured, in response to determining whether the attempt is eligible for notification, when the attempt is eligible, to cause the processor to generate the second exception, and when the attempt is not eligible, to prevent the processor from generating the second exception and instead, to cause the processor to resume executing the software entity. The introspection engine is configured to determine whether the attempt is malicious.

According to another aspect, a method protects a host system from computer security threats. The host system comprises a hardware processor and a memory, the hardware processor configured to execute a virtual machine (VM), an event filter, and an introspection engine, the event filter executing within the VM, the introspection engine executing outside of the VM. The method comprises: configuring the hardware processor to generate a first exception in response to detecting an attempt by a software entity executing within the VM to access a memory location in a manner which violates a memory access permission. The method further comprises configuring the hardware processor to switch, in response to the first exception, from executing the software entity to executing the event filter, and to switch, in response to a second exception, from executing the event filter to executing the introspection engine. The method further comprises, in response to the first exception, employing the event filter to determine according to an event eligibility criterion whether the attempt is eligible for notification to the introspection engine. The method further comprises, in response to determining whether the attempt is eligible for notification, when the attempt is eligible, causing the processor to generate the second exception, and when the attempt is not eligible, preventing the processor from generating the second exception and instead, causing the processor to resume executing the software entity. The method further comprises, in response to the second exception, employing the introspection engine to determine whether the attempt is malicious.

According to another aspect, a non-transitory computer-readable medium stores instructions which, when executed by a hardware processor of a host system exposing a virtual machine, cause the host system to form an event filter and an introspection engine, the event filter executing within the VM, the introspection engine executing outside of the VM. The introspection engine is configured to configure the hardware processor to generate a first exception in response to detecting an attempt by a software entity executing within the VM to access a memory location in a manner which violates a memory access permission. The introspection engine is further configured to configure the hardware processor to switch, in response to the first exception, from executing the software entity to executing the event filter, and to switch, in response to a second exception, from executing the event filter to executing the introspection engine. The introspection engine is further configured, in response to the second exception, to determine whether the attempt is malicious. The event filter is configured, in response to the first exception, to determine according to an event eligibility criterion whether the attempt is eligible for notification to the introspection engine. The event filter is further configured, in response to determining whether the attempt is eligible for notification, when the attempt is eligible, cause the processor to generate the second exception, and when the attempt is not eligible, to prevent the processor from generating the second exception and instead, to cause the processor to resume executing the software entity.

BRIEF DESCRIPTION OF THE DRAWINGS

The foregoing aspects and advantages of the present invention will become better understood upon reading the following detailed description and upon reference to the drawings where.

DETAILED DESCRIPTION OF PREFERRED EMBODIMENTS

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. Computer security encompasses protecting users and equipment against unintended or unauthorized access to data and/or hardware, unintended or unauthorized modification of data and/or hardware, and destruction of data and/or hardware. A computer program is a sequence of processor instructions carrying out a task. Computer programs described in some embodiments of the present invention may be stand-alone software entities or sub-entities (e.g., subroutines, libraries) of other computer programs. Unless otherwise specified, a process is an instance of a computer program, such as an application or a part of an operating system, and is characterized by having at least an execution thread and a virtual memory space assigned to it, wherein a content of the respective virtual memory space includes executable code. Unless otherwise specified, a page represents the smallest unit of virtual memory that can be individually mapped to a physical memory of a host system. A program is said to execute within or inside a virtual machine when it executes on a virtual processor of the respective virtual machine. Computer readable media encompass non-transitory media such as magnetic, optic, and semiconductor storage media (e.g. hard drives, optical disks, flash memory, DRAM), as well as communication links such as conductive cables and fiber optic links. According to some embodiments, the present invention provides, inter alia, computer systems comprising hardware (e.g. one or more processors) programmed to perform the methods described herein, as well as computer-readable media encoding instructions to perform the methods described herein.

The following description illustrates embodiments of the invention by way of example and not necessarily by way of limitation.

Figure 1:
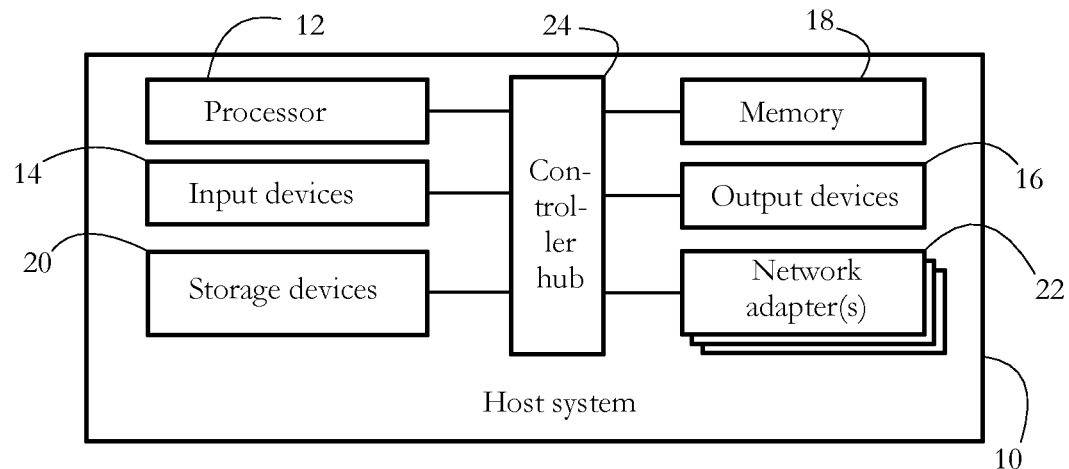
FIG. 1 illustrates an exemplary hardware configuration of a host system according to some embodiments of the present invention.

FIG. 1 shows an exemplary hardware configuration of a host system 10 protected from computer security threats according to some embodiments of the present invention. Host system 10 may represent a corporate computing device such as an enterprise server, or an end-user device such as a personal computer, tablet computer, or smartphone. Other exemplary host systems include game consoles, household appliances such as smart TVs, wearable computing devices, or any other device having a memory and a processor. Host system 10 may be used to execute a set of software applications, such as a browser, a word processing application, and an electronic communication (e.g., email, instant messaging) application, among others. In some embodiments, host system 10 is configured to support hardware virtualization and to expose a set of virtual machines, as shown below.

For simplicity, FIG. 1 illustrates a computer system; the hardware configuration of other host systems, such as smartphones and tablet computers, may differ. System 10 comprises a set of physical devices, including a processor 12, a memory unit 18, a set of input devices 14, a set of output devices 16, a set of storage devices 20, and a set of network adapters 22, all inter connected by a controller hub 24. Processor 12 comprises a physical device (e.g., microprocessor, multi-core integrated circuit formed on a semiconductor substrate) configured to execute computational and/or logical operations with a set of signals and/or data. In some embodiments, such logical operations are delivered to processor 12 in the form of a sequence of processor instructions (e.g. machine code or other type of software). Memory unit 18 may comprise volatile computer-readable media (e.g. RAM) storing data/signals accessed or generated by processor 12 while carrying out instructions.

Input devices 14 may include computer keyboards, mice, and microphones, among others, including the respective hardware interfaces and/or adapters allowing a user to introduce data and/or instructions into host system 10. Output devices 16 may include display devices such as monitors and speakers, among others, as well as hardware interfaces/adapters such as graphic cards, allowing host system 10 to communicate data to a user. In some embodiments, input devices 14 and output devices 16 may share a common piece of hardware, as in the case of touch-screen devices. Storage devices 20 include computer-readable media enabling the non-volatile storage, reading, and writing of processor instructions and/or data. Exemplary storage devices 20 include magnetic and optical disks and flash memory devices, as well as removable media such as CD and/or DVD disks and drives. The set of network adapters 22 enables host system 10 to connect to a computer network and/or to other devices/computer systems. Controller hub 24 generically represents the plurality of system, peripheral, and/or chipset buses, and/or all other circuitry enabling the communication between processor 12 and devices 14, 16, 18, 20 and 22. For instance, controller hub 24 may include a memory management unit (MMU), an input/output (I/O) controller, and an interrupt controller, among others. In another example, controller hub 24 may comprise a northbridge connecting processor 12 to memory 18 and/or a southbridge connecting processor 12 to devices 14, 16, 20, and 22. In some hardware platforms, the MMU is integrated, in part or entirely, with processor 12, i.e., the MMU shares a common semiconductor substrate with processor 12.

Figure 2:
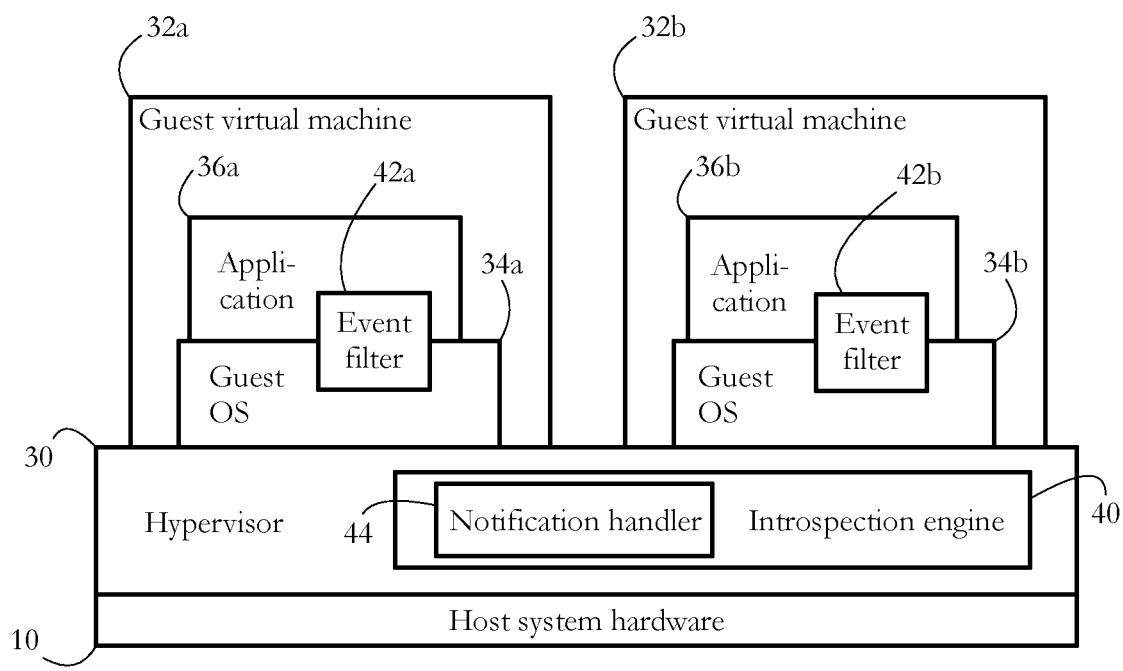
FIG. 2 shows a set of guest virtual machines (VM) exposed by a hypervisor executing on the host system, and a set of security components protecting the respective VMs according to some embodiments of the present invention.

FIG. 2 shows an exemplary configuration wherein a set of security components collaborate to protect a set of virtual machines against computer security threats according to some embodiments of the present invention. The illustrated host system 10 uses hardware virtualization technology to operate a set of guest virtual machines (VM) 32a-b exposed by a hypervisor 30. Although FIG. 2 was drafted to show just two guest VMs, some embodiments may host many more VMs (e.g., hundreds) operating concurrently. Using a hypervisor to manage multiple virtual machines is common in applications such as cloud computing and server consolidation, among others. Examples of popular hypervisors include the VMware vSphere® from VMware Inc. and the open-source Xen hypervisor, among others.

Virtual machines are known in the art as emulations of actual physical machines/computer systems, capable of running an operating system and other applications. In some embodiments, hypervisor 30 includes software configured to create or enable a plurality of virtualized devices, such as a virtual processor and virtual controllers, and to present such virtualized devices to software in place of the real, physical devices of host system 10. Such operations of hypervisor 30 are commonly known in the art as exposing a virtual machine. Hypervisor 30 typically allows a multiplexing (sharing) of hardware resources of host system 10 by multiple virtual machines. Hypervisor 30 may further manage the hardware of host system 10 so that each guest VM 32a-b operates independently and is unaware of other VMs executing concurrently executing on host system 10.

Each virtualized device (e.g., processor, input, output, storage, etc.) emulates at least some of the functionality of the respective physical device of host system 10. For instance, software executing on virtualized processor of a guest VM may send and/or receive network traffic via a virtualized network adapter. In some examples, hypervisor 30 may expose only a subset of virtualized devices to each guest VM (for instance, only a virtualized processor, memory, and parts of a controller hub). Hypervisor 30 may also give a selected VM direct and exclusive use of some hardware devices of host system 10. In one such example, guest VM 32a (FIG. 2) may have exclusive use of input devices 14 and output devices 16, but lack a virtualized network adapter. Meanwhile, guest VM 32b may have direct and exclusive use of network adapter(s) 22. Such configurations may be implemented, for instance, using VT-D® technology from Intel®.

In some embodiments, exposing each guest VM 32a-b comprises configuring a data structure used by hypervisor 30 to manage operation of the respective guest VM. Such a structure will be herein termed virtual machine state object (VMSO). Exemplary VMSOs include the virtual machine control structure (VMCS) on Intel® platforms, and the virtual machine control block (VMCB) on AMD® platforms. In some embodiments, processor 16 associates a region in memory with each VMSO, so that software may reference a specific VMSO using a memory address or pointer (e.g., a VMCS pointer on Intel® platforms).

Each VMSO may comprise data representing a current state of a respective virtualized processor exposed on host system 10. In multithreading configurations, hardware processor 12 may operate a plurality of cores, each core further comprising multiple logical processors, wherein each logical processor may process an execution thread independently of, and concurrently with, other logical processors. Multiple logical processors may share some hardware resources, for instance, a common MMU. In a multithreaded embodiment, a distinct VMSO may be set up for each distinct logical processor. The respective VMSO may comprise a guest state area and a host state area, the guest state area holding the CPU state of the respective VM, and the host state area storing the current state of hypervisor 30. In some embodiments, the guest-state area of the VMSO includes contents of the control registers (e.g., CR0, CR3, etc.), instruction pointer (e.g., RIP), general-purpose registers (e.g., EAX, ECX, etc.), and status registers (e.g., EFLAGS) of the virtual processor of the respective VM, among others. The host state area of the VMSO may include a pointer (e.g., an EPT pointer on Intel® platforms) to a page table configured for address translations for the respective VM.

In some embodiments, processor 12 may store a part of a VMSO within dedicated internal registers/caches, while other parts of the respective VMSO may reside in memory 18. At any given time, at most one VMSO (herein termed the current VMSO) may be loaded onto a logical processor, identifying the virtual machine currently having control of the respective logical processor. When processor 12 switches from executing a first VM to executing a second VM or hypervisor 30, processor 12 may save the current state of the first VM to the guest state area of the current VMSO.

Each of the illustrated guest VMs (FIG. 2) may execute a guest operating system (OS) 34a-b, respectively. Operating systems 34a-b may comprise any widely available operating system such as Microsoft Windows®, MacOS®, Linux®, iOS®, or Android®, among others. Each OS 34a-b provides an interface between applications executing within the respective VM and the (virtualized) hardware devices of the respective VM. A set of exemplary applications 36a-b generically represent any software application, such as word processing, image processing, media player, database, calendar, personal contact management, browser, gaming, voice communication, data communication, and computer security applications, among others. In the following description, software executing on a virtual processor of a virtual machine is said to execute within the respective virtual machine. For instance, in the example of FIG. 2, application 36a is said to execute within guest VM 32a, while application 36b is said to execute within guest VM 32b. In contrast, hypervisor 30 is said to execute outside, or below, guest VMs 32a-b.

In some embodiments, a plurality of security components collaborate to protect guest VMs 32a-b against computer security threats such as malicious software. FIG. 2 illustrates such security components as a set of event filters 42a-b executing within guest VMs 32a-b, respectively, and an introspection engine 40 executing outside guest VMs 32a-b. Introspection engine 40 may further include a notification handler 44. In some embodiments, each event filter 42a-b detects the occurrence of certain events during execution of software within the respective guest VM. Exemplary events intercepted by filters 42a-b include a processor exception and/or interrupt, calling certain functions of OS 34a-b, accessing a registry of OS 34a-b, downloading a file from a remote location, and writing data to a file, among others. In some embodiments, filters 42a-b execute at a processor privilege level of the respective operating system (e.g., kernel mode).

Event filters 42a-b may filter the detected events according to a set of rules, to identify a subset of events which are especially relevant to computer security, and to notify introspection engine 40 about the occurrence of the selected subset of events. In some embodiments, introspection engine 40 analyzes the received notifications to determine whether the respective events indicate a malware attack. Engine 40 may also carry out other security-related operations, such as determining an address of a memory section containing a part of a software object executing within a guest VM, accessing the respective memory section, and analyzing content stored within the respective memory section. Other examples of security operations performed by introspection engine 40 include intercepting and/or restricting access to certain memory sections, e.g., preventing the over-writing of code or data belonging to a protected process, and preventing the execution of code stored in certain memory pages.

A single introspection engine 40 may protect multiple guest VMs executing on host system 10. Engine 40 may be incorporated into hypervisor 30 (for instance as a set of libraries), or may be delivered as a computer program distinct and independent from hypervisor 30, but executing at the processor privilege level of hypervisor 30. Engine 40 may or may not be a process (having a separate scheduled execution thread). In some embodiments, engine 40 comprises a collection of unscheduled code objects executing when triggered by certain processor events. The operation of event filters 42a-b and introspection engine 40 is described in further detail below.

Modern processors implement a hierarchy of processor privilege levels, also known in the art as protection rings. Each such ring or level is characterized by a set of actions and/or processor instructions that software executing within the respective ring is allowed to carry out. Exemplary privilege levels/rings include user mode (ring 3) and kernel mode (ring 0). Some host systems configured to support hardware virtualization may include an additional ring with the highest processor privileges (e.g., ring −1, root mode, or VMXroot on Intel® platforms). In some embodiments, hypervisor 30 takes control of processor 12 at the most privileged level (ring −1), thus creating a hardware virtualization platform exposed as a virtual machine to other software executing on host system 10. An operating system, such as guest OS 34a in FIG. 2, executes within the virtual environment of the respective VM, typically with lesser processor privilege than hypervisor 30 (e.g., in ring 0 or kernel mode). Common user applications, such as application 36a, typically execute at lesser processor privilege than OS 34a (e.g., in ring 3 or user mode). When a software object attempts to execute an action or instruction requiring more processor privilege than allowed by its assigned protection ring, the attempt typically generates a processor event, such as an exception or a fault, which transfers control of processor 12 to an entity (e.g., event filter of the operating system) executing in a ring with enough privileges to carry out the respective action.

In particular, execution of some processor instructions requires the privilege level of hypervisor 30 (e.g., VMX-root). Examples of such instructions include VMCALL on Intel® platforms. In some hardware systems, invoking such an instruction from within a virtual machine generates a particular type of fault known as a virtual machine exit event (e.g., VMExit on Intel® platforms). VM exit events suspend the execution of the respective virtual machine and switch processor 12 to executing a handler routine outside the respective VM, typically at the processor privilege level of hypervisor 30.

In some hardware platforms, VM exits may be triggered by other types of events, such as a violation of a memory access permission. In one such example, when a software object executing within a VM attempts to write data to a memory page marked as non-writable, or to execute code from a memory page marked as non-executable, processor 12 may generate a page fault, and in response, suspend execution of the respective VM, and switch to executing hypervisor 30. Such exit mechanisms may allow, for example, a computer security program executing outside the respective VM (such as introspection engine 40) to protect the virtual machine against security threats. In some embodiments, introspection engine 40 intercepts VM exit events occurring during execution of software inside the VM and further analyzes such events, potentially without the knowledge of in-VM software. In case the event is indicative of an attack, engine 40 may take several threat-mitigating actions, such as suspending execution of the respective guest VM, cutting off communications to and/or from the respective guest VM, injecting a cleanup agent into the respective guest VM, alerting a user of host system 10, etc.

Modern computing platforms optimized for hardware virtualization are configured to also generate another kind of processor event triggered by privileged instructions and/or violations of memory access permissions. Such processor events are commonly known as virtualization exceptions (e.g., #VE on Intel® platforms), and cause the processor to switch from executing software within the guest VM to executing a handler routine also within the respective guest VM, therefore avoiding the computational cost typically associated with a VM exit event. Some processors are configurable to selectively generate either a VM exit event or a virtualization exception in response to various situations.

Virtual machines typically operate with a virtualized physical memory, also known in the art as guest-physical memory. Virtualized physical memory comprises an abstract representation of the actual physical memory 18, for instance as a contiguous space of addresses specific to each VM, with parts of said space mapped to addresses within physical memory 18 and/or physical storage devices 20. In modern hardware virtualization platforms, such mapping is typically achieved via dedicated data structures and mechanisms controlled by processor 12, known as second level address translation (SLAT). Popular SLAT implementations include extended page tables (EPT) on Intel® platforms, and rapid virtualization indexing (RVI)/nested page tables (NPT) on AMD® platforms. In such systems, virtualized physical memory is partitioned in units known in the art as pages, a page representing the smallest unit of virtualized physical memory individually mapped to physical memory via SLAT, i.e., mapping between physical and virtualized physical memory is performed with page granularity. All pages typically have a predetermined size, e.g., 4 kilobytes, 2 megabytes, etc. The partitioning of virtualized physical memory into pages is usually configured by hypervisor 30. In some embodiments, hypervisor 30 also configures the SLAT structures and therefore the mapping between physical memory and virtualized physical memory. In some embodiments, a pointer to a SLAT data structure (e.g., to a page table) is stored within the VMSO of the respective virtual machine. The actual mapping (translation) of a virtualized physical memory address to a physical memory address may comprise looking up the physical memory address in a translation lookaside buffer (TLB) of host system 10. In case of a TLB miss, address translation comprises performing a page walk, which includes a set of successive address look-ups in a set of page tables and/or page directories, and performing calculations such as adding an offset of a page to an address relative to the respective page.

Figure 3:
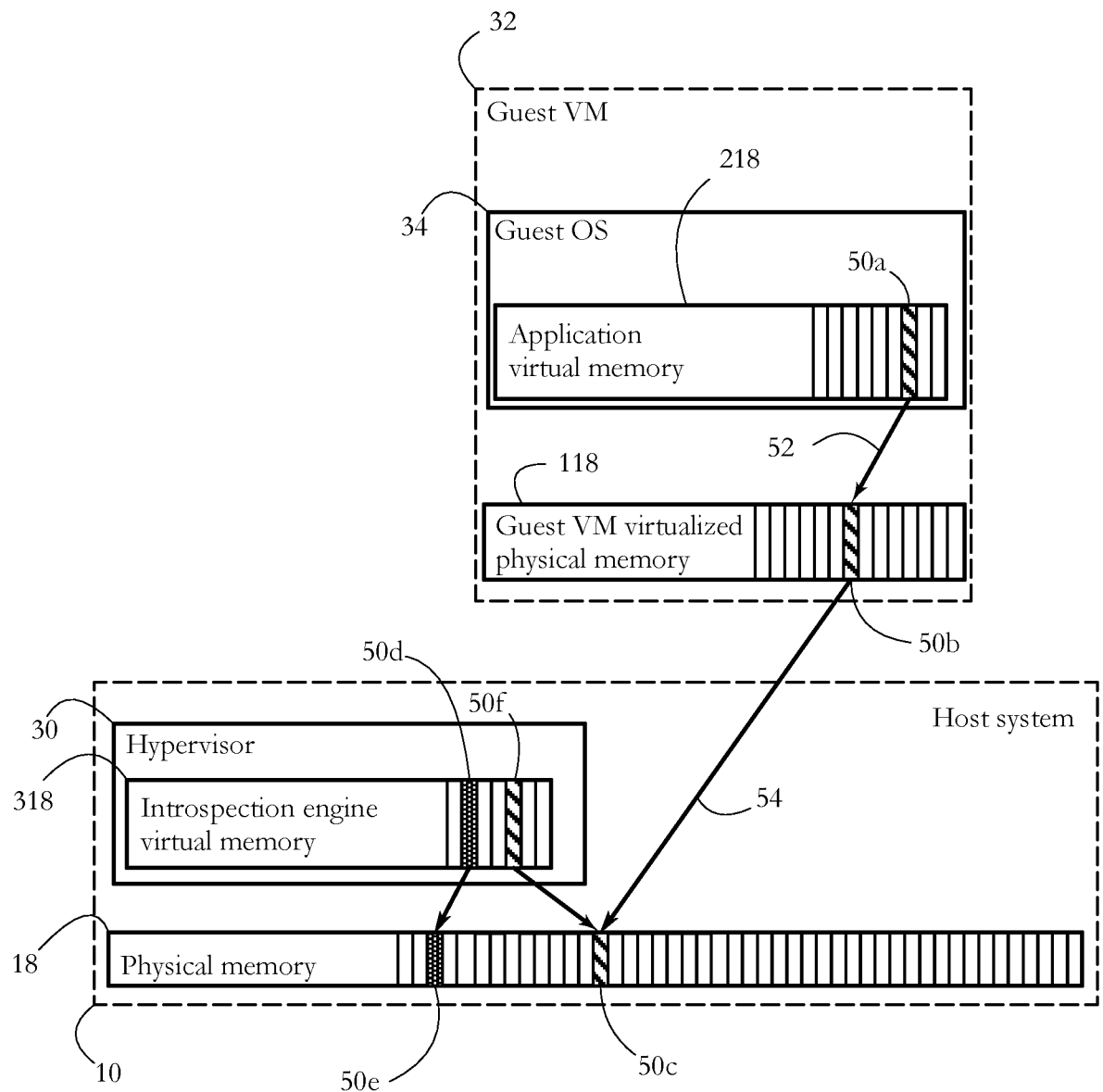
FIG. 3 shows an exemplary memory address translation in a configuration of virtual machines as illustrated in FIG. 2.

FIG. 3 illustrates a mapping of memory addresses in an embodiment as shown in FIG. 2. Guest VM 32 generically represents any guest virtual machine executing on host system 10, for instance VMs 32a-b in FIG. 2. Following exposure by hypervisor 30, guest VM 32 sees a virtualized physical memory space 118 as its own physical memory space. A software object (e.g., a process) executing within guest VM 32 is assigned a virtual memory space 218 by a guest OS 34 of the respective VM. When the software object attempts to access a content of an exemplary memory page 50a of space 218a, an address of page 50a is translated by the virtualized processor of guest VM 32 into an address of a page 50b of virtualized physical memory space 118, according to page tables configured and controlled by guest OS 34. The address of page 50b is further mapped by physical processor 16 to an address of a page 50c within physical memory 18 using SLAT configured by hypervisor 30.

Virtual address space 118 is commonly known in the art as guest-physical memory, and an address within one such a memory space is referred to as a guest physical address (GPA). Address space 218 is usually termed guest-virtual memory, and is indexed by guest-virtual addresses (GVA). Addresses within physical memory 18 are usually referred to as host-physical addresses (HPA). An address translation/mapping 52 in FIG. 3 is therefore termed GVA-to-GPA translation. In contrast, an address translation 54 is commonly referred to as a GPA-to-HPA translation.

Figure 4:
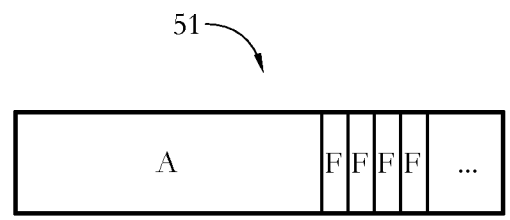
FIG. 4 shows an exemplary page table entry according to some embodiments of the present invention.

Address translations 52 and 54 rely on the memory paging mechanism and the utilization of page tables. Page tables are data structures generally storing a mapping between virtual and physical memory pages in the form of a collection of page table entries. The format of page table entries may vary from one hardware platform to another, and/or from one version of OS to another. An exemplary page table entry 51 is illustrated in FIG. 4. Each such page table entry may correspond to a virtual memory page, for instance to page 50a within memory space 218 in FIG. 3. In some embodiments, page table entry 51 comprises a set of fields storing, among others, an address A and a set of flags F. Address A is typically a physical address; in hardware virtualization platforms, it may represent a GPA. In a system implementing hierarchical page tables, address A may indicate an address of another page table. The content of flag fields varies among implementations. In some embodiments, flags are control bits indicating, for instance, whether the respective page is present in memory (as opposed to swapped out to disk), whether the contents of the respective page have changed since it was last swapped in, whether an attempt to access an address within the respective page generates a fault (such as a VMexit or virtualization exception), whether the respective page can be accessed by a process executing in user mode, etc. Other flags/control bits may indicate a set of memory access permissions (e.g., read, write, execute). In some embodiments, page table entry 51 may further store an identifier of the respective memory space (e.g., process ID), and/or various statistical information used by memory management components of the operating system.

In some embodiments, hypervisor 30 sets up its own virtual memory space 318 comprising a representation of physical memory 18, and employs a translation mechanism (for instance, page tables) to map addresses in space 318 to addresses in physical memory 18. In FIG. 3, such an exemplary mapping translates the address of a page 50f within virtual space 318 to the physical address of page 50c, and the address of a page 50d to the physical address of page 50e. Such mappings allow potentially any software object executing at the processor privilege level of hypervisor 30 to manage memory pages belonging to software objects executing within various VMs running on host system 10. In particular, memory introspection engine 40 may enumerate, read, write, and control access to/from physical memory pages used by a process executing within guest VM 32.

Figure 5:
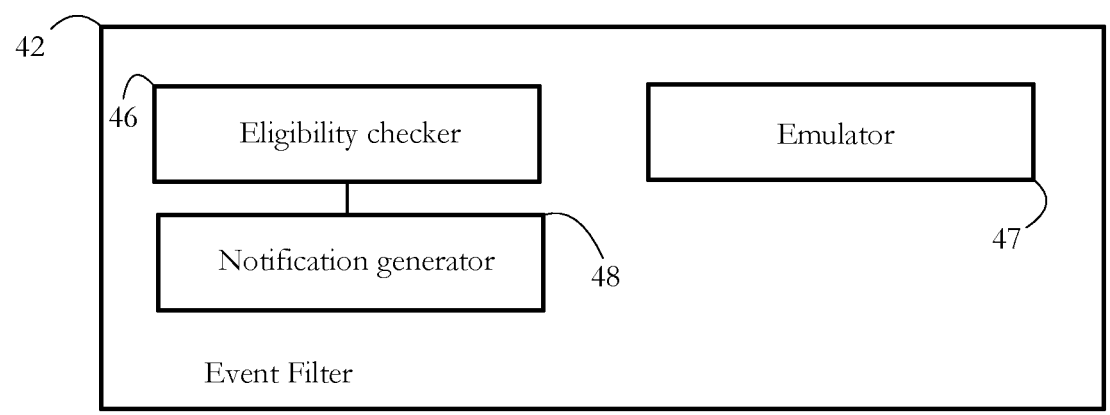
FIG. 5 illustrates exemplary components of an event filter executing within a protected guest virtual machine according to some embodiments of the present invention.

FIG. 5 shows exemplary components of an event filter 42 according to some embodiments of the present invention. Filter 42 may generically represent any of event filters 42a-b in FIG. 2. In some embodiments, event filter 42 is registered with processor 12 as the software component configured to handle virtualization exceptions for the respective guest VM. This registration means that when an event occurring during execution of a guest process within the respective guest VM triggers a virtualization exception, processor 12 suspends execution of the respective guest process and switches to executing filter 42. Filter 42 may include an eligibility checker 46 and a notification generator 48 connected to eligibility checker 46.

In some embodiments, eligibility checker 46 is configured to filter events that triggered virtualization exceptions, to produce a subset of events considered malware-indicative or in other ways relevant to computer security. Exemplary security-relevant events may include, for instance, an attempt to overwrite a field of a page table entry, an attempt to execute a critical OS component such as a memory allocation function, an attempt to read, write, or execute code to/from a specific memory section, etc. Notification generator 48 may be configured to notify introspection engine 40 about the occurrence of the selected subset of events produced by eligibility checker 46. The notification mechanism may employ any method known in the art of hardware virtualization, such as triggering a VM exit event via a privileged processor instruction such as VMCALL. Notification generator 48 may transmit data, such as details or parameters of the notified events, to introspection engine 40 for instance by writing the respective data to a predetermined section of memory shared between filter 42 and engine 40.

In some embodiments, event filter 42 further comprises an emulator 47 configured to emulate the occurrence of the event which triggered a virtualization exception. Emulation may be required since exceptions are typically triggered before the respective event causes changes to memory and/or to the state of the processor. In one example wherein virtualization exceptions are triggered by violations of memory access permissions, a processor instruction such as MOV, which would cause data to be written to a location deemed non-writable, generates a virtualization exception before any data gets written to the respective location. Simply relaunching the respective process/application would result in an attempt to re-execute the offending instruction, which in turn would trigger a new exception. To escape this infinite cycle, some embodiments use emulator 47 to emulate the occurrence of the respective event before relaunching the process/application that triggered the exception in the first place. In the above example, emulator 47 may effect the changes that would have resulted from an actual execution of the MOV instruction, i.e., emulator 47 may actually write the data to its intended memory location.

Figure 6:
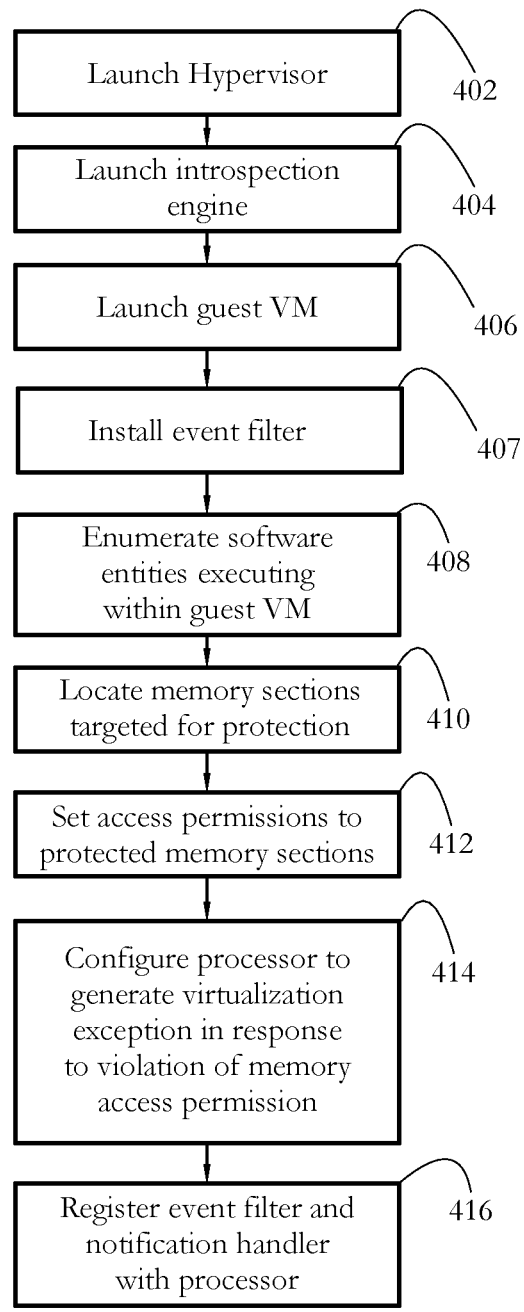
FIG. 6 shows an exemplary sequence of steps performed to install and initialize security software on a host system according to some embodiments of the present invention.

FIG. 6 shows an exemplary sequence of steps performed to set up computer security on host system 10 according to some embodiments of the present invention. In a typical scenario, a system administrator may install a security application on each host that requires protection. The security application may comprise various components, such as hypervisor 30, introspection engine 40, event filter 42, etc. The illustrated sequence of steps may be carried out, for instance, by an installer utility of the respective security application. The installer may first take over processor 12 at the strongest processor privilege level (e.g., root mode, ring −1), and install hypervisor 30. The installer may then launch introspection engine 40.

In some embodiments, hypervisor 30 and/or introspection engine 40 are launched using a secure boot mechanism or another form of authentication known in the art, to ensure the trustworthiness of the respective software components. Secure booting may comprise authentication exchanges (e.g., hash verification) with a remote authentication server. In one exemplary embodiment, the secure boot may employ a secure storage hardware component of host system 10, such as a Trusted Platform Module (TPM) on Intel® platforms, and further employ an integrity attestation mechanism such as Intel®'s Trusted Execution Technology (TXT).

In response to launching each guest VM, a step 407 installs event filter 42 configured to handle virtualization exceptions occurring within the respective VM. In some embodiments, event filter 42 may be surreptitiously dropped into the respective guest VM, to avoid detection of filter 42 by potentially malicious software. To achieve such injection, introspection engine 40 may hide filter 42 within an unused section of memory, or within a memory page currently used by another software object, such as a driver.

In some embodiments, introspection engine protects event filter 42 by isolating filter 42 from other components executing within the respective VM. In one example, engine 40 uses SLAT means to set up a shadow memory space distinct from the guest-physical memory space used by the respective guest VM (e.g., distinct from space 118 in an embodiment as illustrated in FIG. 3). In practice, setting up such a shadow memory space may include engine 40 configuring a second-level page table (e.g., an EPT on an Intel® platform) assigned to event filter 42. Operating with a distinct page table isolates filter 42 from any other processes executing within VM 32, in the sense that such processes cannot modify data belonging to event filter 42. Isolating filter 42 may further comprise configuring processor 12 to switch, when executing filter 42, from using a page table associated with VM 32 to using the shadow page table to carry out address translations. Switching page tables may occur without exiting guest VM 32, so it does not carry the computational cost of a VM exit event. One exemplary may to achieve a page table switch includes event filter 42 issuing a certain privileged instruction (e.g., VMFUNC on Intel® platforms), which may be interpreted by processor 12 as a cue for the switch.

In a sequence of steps 408-410, introspection engine 40 may proceed to identify a set of memory pages storing assets which are important for the security of the respective guest VM. Examples of such assets include code belonging to functions of the OS which perform operations such as memory allocation, memory permission management, and registry editing, e.g., selected functions of the NTDLL.DLL and KERNEL32.DLL libraries. In a Linux® OS, security-relevant functions may include selected functions of LIBC.SO. Other assets considered important for security include a page table associated with a process executing within the guest VM.

The memory location of some assets such as specific functions of the OS may be obtained by parsing certain data structures of OS 34. Introspection engine 40 may further keep track of a set of processes currently loaded and/or executing within the respective guest VM. Some embodiments may listen for events indicative of a launch of a new process/thread within the guest VM, using any method known in the art. Some exemplary embodiments intercept a mechanism of the OS that manages the list of active processes. For instance, in Windows®, each time a process is created, an indicator of the respective process is inserted into the list of active processes; the indicator is removed from the list upon termination of the respective process. In some embodiments, upon launching a process, OS 34 also sets up a process-specific data structure known as a process environment block (PEB) comprising data used by OS 34 to manage resources associated to the respective process. By intercepting an OS instruction to insert the target process into the list of active processes, engine 40 may obtain further information such as a memory address of the respective PEB. In Windows®, the virtual address of the PEB is stored in a data structure known as the executive process block (EPROCESS). By further parsing such data structures, introspection engine 40 may obtain information such as memory locations of a main executable and/or of libraries loaded by the respective process, as well as a memory location of a page table (for instance the Page Directory Base Register—PDBR in x86 platforms) associated with the respective process.

The memory location of page table entries corresponding to various processes currently loaded and/or executing may be obtained, for instance, by reading a content of a control register of processor 12 (e.g., the CR3 register in x86 platforms), and performing a page table walk. An alternative embodiment may read an address of a page table associated to each process from specific fields of the respective EPROCESS structures.

To facilitate determination of the memory location of security-critical assets, introspection engine 40 may collaborate with filter 42, or may drop a helper object into the respective guest VM. Such strategies are designed to bridge a semantic gap. It is typically much more difficult to uncover information about the inner workings of a virtual machine from a position outside the respective VM, than from within the respective VM. A component such as event filter 42 executing within the VM may use the facilities of the OS to obtain information such as memory addresses of various assets, and then communicate such information to introspection engine 40 using the notification mechanism described herein.

In some embodiments, in step 410 (FIG. 6), introspection engine 40 and/or filter 42 may assemble a roster of protected memory sections comprising an enumeration of memory sections that contain parts of protected assets. An exemplary roster entry may comprise a memory address of the section (or an identifier of a memory page and an offset with respect to a page boundary), and an indicator of a size of the respective section. The memory address may include a GPA, HPA, etc. The size of the protected section may be smaller than the page size. A roster entry may further comprise an indicator of an asset type stored within the respective section (e.g., driver, page table, private data, etc.). Including asset type indicators in the roster entry may facilitate execution of event filter 42 by allowing filter 42 to selectively apply event eligibility criteria according to a type of protected asset, for instance to protect page tables in a manner distinct from protecting a user's private files. In some embodiments, the roster is updated dynamically: when new assets appear (e.g., via new process launches), sections storing parts of protected assets are identified and added to the roster. When assets no longer require protection (e.g., when a process is terminated) or when the respective assets move to another memory location, entries corresponding to obsolete sections may be removed from the roster.

In response to determining the memory location of security-critical objects, a step 412 may set access permissions to the protected memory sections. Since in most current computing systems permissions may only be set with page granularity, step 412 may comprise setting access permissions to the memory pages hosting the respective memory sections. This can be done for instance using the SLAT mechanism configured by hypervisor 30. Permissions may be set to allow event filter 42 to detect an attempt to access the protected memory sections in a manner considered inappropriate or malware-indicative. To prevent unauthorized reading of data from a protected section (e.g., to avert data theft or a ransomware attack), an exemplary embodiment may mark a memory page hosting the respective data as non-readable. An attempt to read data from the respective page will subsequently trigger a processor exception/fault which may serve as an indicator of the attempt. To detect an attempt modification of a page table entry, a memory page hosting the respective page table entry may be marked as non-writable. Any attempt to write to the respective memory page will thus enable detection of the attempt. Similarly, to detect an attempt to execute a certain OS function, some embodiments mark a page containing the respective function's code as non-executable.

In some embodiments, in a step 414 (FIG. 6), introspection engine 40 may configure processor 12 to trigger virtualization exceptions in response to violations of such memory access permissions. A further step 416 may register event filter 42 as the handler for virtualization exceptions, and notification handler 44 as the handler for VM exit events. In response to such registrations, a violation of a memory access permission will be handled by event filter 42, as opposed to introspection engine 40. Meanwhile, VM exit events will be notified to introspection engine 40 via notification handler 44.

Figure 7:
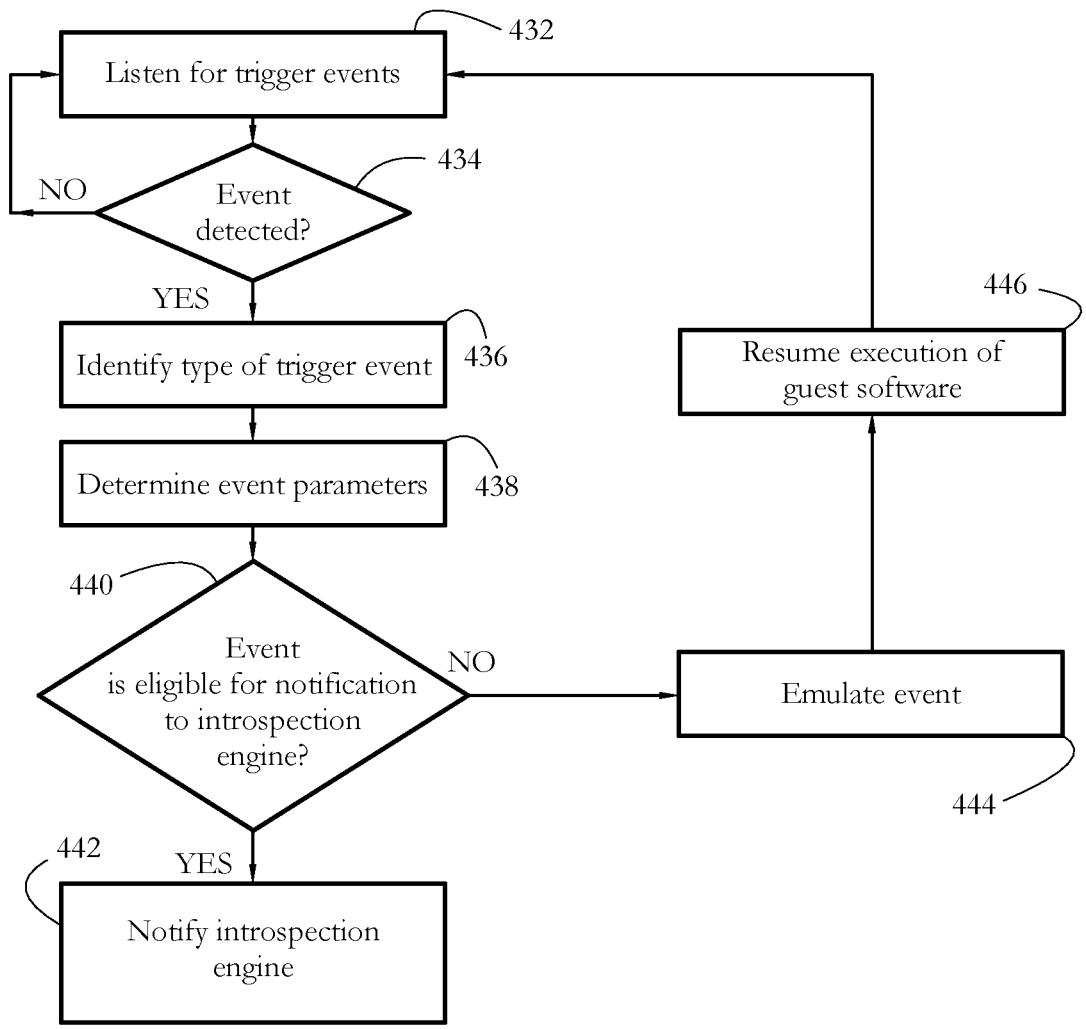
FIG. 7 shows an exemplary sequence of steps carried out by the event filter according to some embodiments of the present invention.

FIG. 7 shows an exemplary sequence of steps performed by event filter 42 in some embodiments of the present invention. Having been registered as handler for virtualization exceptions, event filter 42 detects the occurrence of events that trigger virtualization exceptions during execution of guest software. Such events will herein be referred to as trigger events. In response to detecting a trigger event, in a sequence of steps 436-438 filter 42 may determine an event type of the respective trigger event, as well as a set of event parameters. In some embodiments, an indicator of the cause of the current virtualization exception is stored in a specific field of the VMSO of the respective guest VM. Therefore, clues about the nature of the event may be extracted from certain fields of the VMSO of the respective guest VM. In an example where the exception was triggered by an attempt to write to a page marked as non-writable, event parameters may include a memory address of the write attempt, and the value that the processor was attempting to write to the respective memory location.

In some embodiments, event filter 42 selectively notifies introspection engine 40 about the occurrence of a subset of trigger events considered relevant for security. Events may be selected according to a set of eligibility criteria, and only events deemed eligible may be communicated to introspection engine 40. In response to detecting the occurrence of a trigger event which is not considered eligible for communicating to introspection engine 40, some embodiments employ emulator 47 to emulate the detected event (step 444 in FIG. 7). Subsequently, filter 42 may signal to processor 12 to resume execution of guest software within the respective VM, without triggering a VM exit. When an event satisfies the eligibility criteria, in a step 442 some embodiments generate a VM exit event, thus notifying introspection engine 40 of the occurrence of the respective trigger event. Generating the VM exit event may comprise, for instance, filter 42 issuing a privileged processor instruction, such as VMCALL on Intel® platforms. To communicate event parameters to engine 40, some embodiments of event filter 42 write the respective parameters to a section of memory shared between filter 42 and introspection engine 40, before generating the VM exit event.

Figure 8:
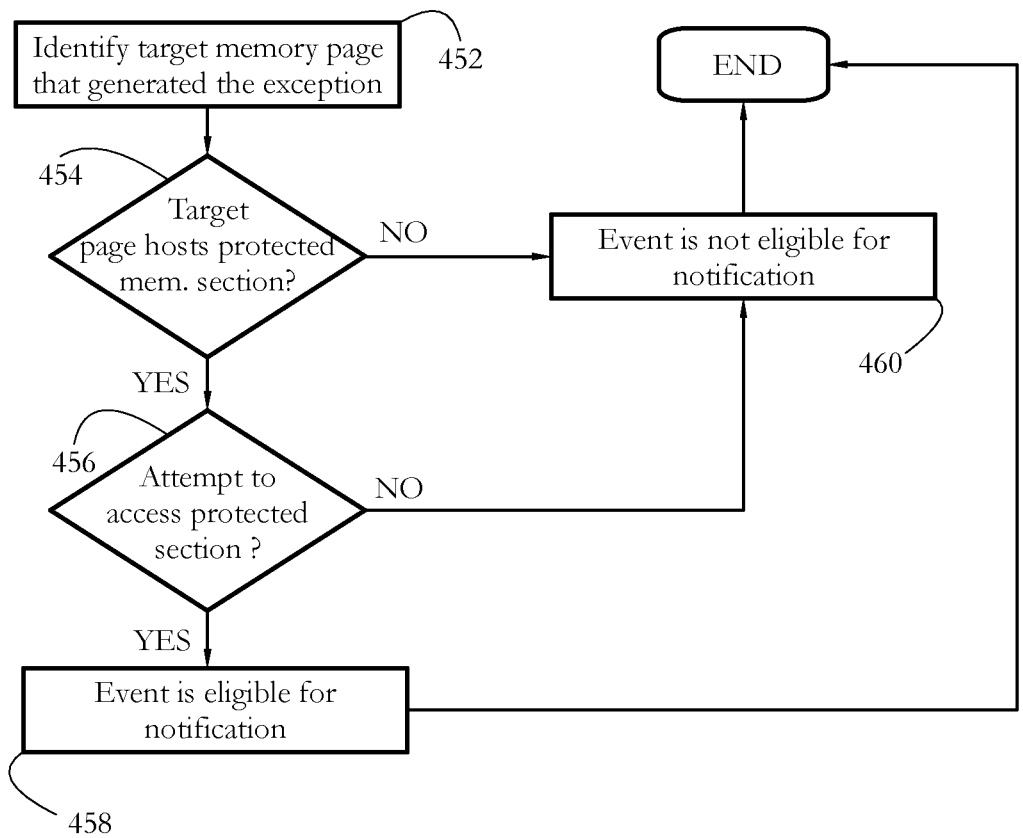
FIG. 8 illustrates an exemplary sequence of steps performed by the eligibility checker component of the event filter to determine whether an intercepted event is eligible for notification to the introspection engine, according to some embodiments of the present invention.
Figure 9:
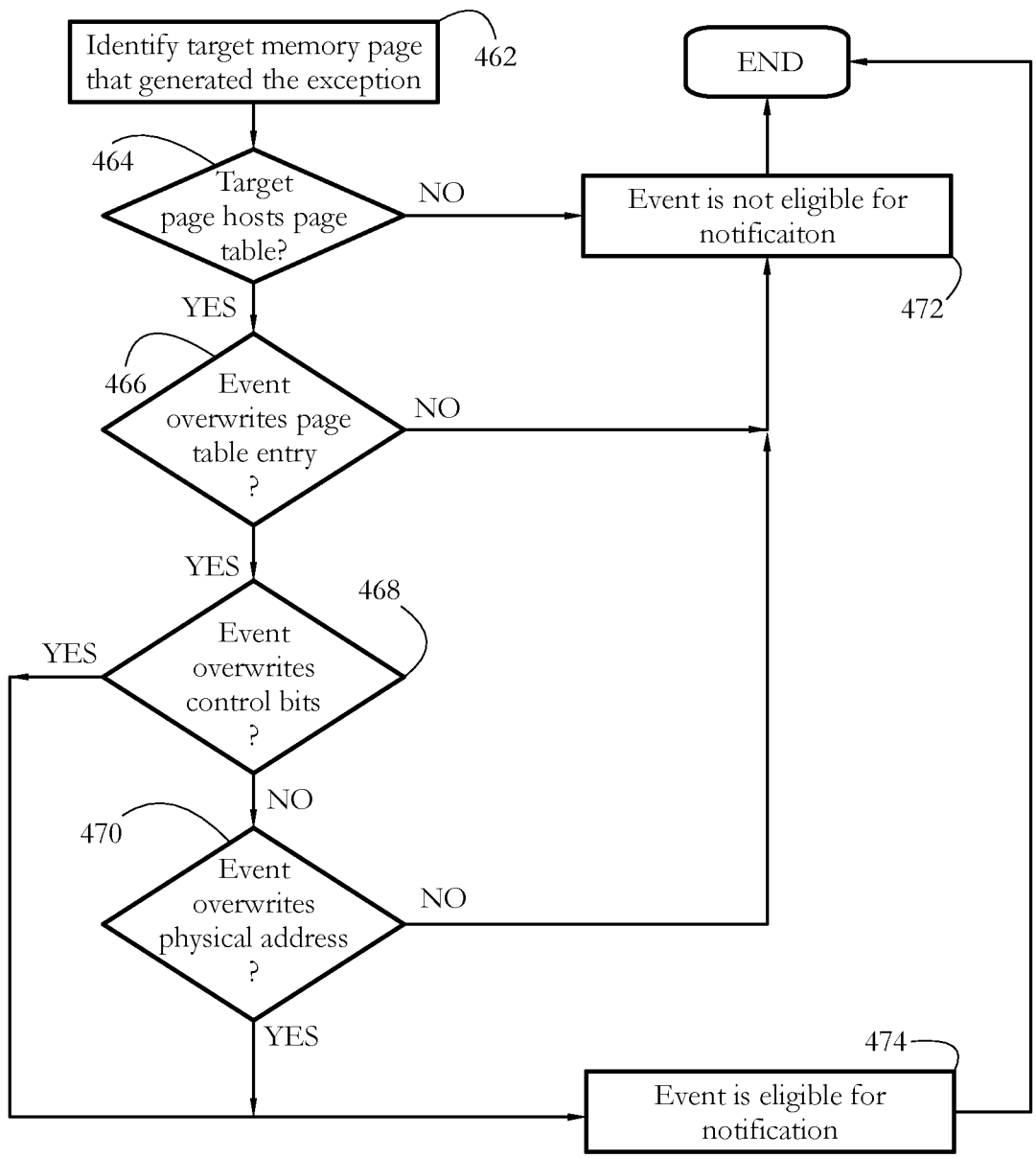
FIG. 9 shows another exemplary sequence of steps performed by the eligibility checker to determine whether an intercepted event is eligible for notification, according to some embodiments of the present invention.

FIGS. 8-9 illustrate exemplary sequences of steps carried out by eligibility checker 46 (FIG. 5) to determine whether a detected trigger event is eligible for notification to introspection engine 40, according to some embodiments of the present invention. Such sequences may be executed as part of step 440 in FIG. 7. Both FIGS. 8-9 assume that the intercepted trigger event comprises an attempt to access memory in a manner which violates an access permission, for instance an attempt to write to a page marked as non-writable.

In a step 452 (FIG. 8), checker 46 may identify the memory page that generated the exception, i.e., the memory page targeted by the access attempt. In response, checker 46 may look up the roster of currently protected memory sections, to determine whether the target memory page contains a protected memory section. i.e., at least a part of a protected asset. When the target memory page does not hold any protected asset, in a step 460 filter may determine that the current trigger event does not warrant notification to introspection engine 40. When the target memory page contains a part of a protected asset, a further step 456 may determine, for instance according to the address of the access attempt, whether the trigger event comprises an attempt to actually access a protected memory section. When no, the trigger event may be deemed non-eligible. In contrast, when the trigger event amounts to an attempt to access a protected memory section, checker 46 may determine that the current trigger event is eligible for notification.

FIG. 9 shows another exemplary sequence of steps carried out by eligibility checker 46 to determine whether an event is eligible for notification, according to some embodiments of the present invention. The example of FIG. 9 is geared toward protecting page tables from malicious modification. In some embodiments, exemplary eligible trigger events comprise an attempt to change a value of a flag/control bit of a page table entry (e.g., bits representing properties such as present/swapped out, read/write, execute-disable, user/supervisor). Other exemplary eligible trigger events comprise an attempt to overwrite the physical address field of the respective page table entry (A field in FIG. 4). Such actions are often indicative of malicious software attempting to hijack execution of the respective process, to inject code into the memory space of the respective process, etc.

Figure 10:
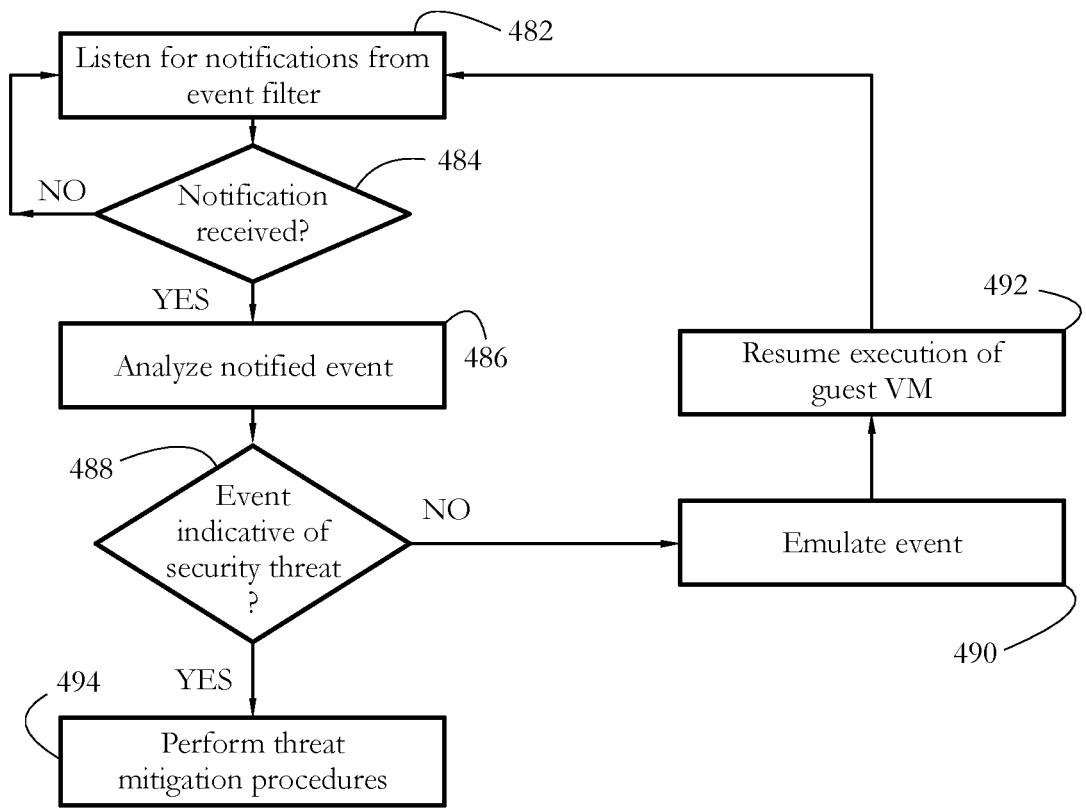
FIG. 10 shows an exemplary sequence of steps performed by the introspection engine according to some embodiments of the present invention.

FIG. 10 shows an exemplary sequence of steps performed by introspection engine 40 according to some embodiments of the present invention. Engine 40 may wait for a notification from filter 42, the notification indicating the occurrence of a particular type of trigger event within the respective guest VM, the respective trigger event deemed eligible for notification by event filter 42. In response to a notification, in a step 486 engine 40 may analyze the respective event to determine whether it is indicative of a computer security threat. Such analysis may employ any method in the art, for instance various heuristics and decision trees, event correlation methods, machine learning algorithms, etc. In step 486 introspection engine 40 may use event parameters communicated by event filter 42 and/or may carry forensic activities of its own to uncover additional information about the current trigger event, or in general about software currently executing within the respective guest VM. In one exemplary analysis, wherein the notified event comprises an attempt to overwrite a control bit of a page table entry, in step 486 engine 40 may determine whether the respective attempt was carried out by the OS as a legitimate memory management manipulation, or instead was carried out by another software entity, in which case the attempt may be considered malware-indicative.

When the analysis of step 486 determines that the respective trigger event is not indicative of a security threat, in some embodiments, introspection engine 40 may emulate the respective trigger event, and instruct processor 12 to resume execution of the respective guest VM. When an event is indicative of a threat, engine 40 may take protective action to mitigate the threat (for instance, carry out a cleanup operation to remove or otherwise incapacitate a malware agent executing within the respective guest VM, notify a user of host system 10, etc.)

The exemplary systems and methods described above allow a host system, such as a computer or a smartphone, to efficiently carry out computer security tasks when operating in a hardware virtualization configuration. The host system is configured to execute an operating system and a set of software applications within a guest virtual machine. In some embodiments, a security application comprises at least two components: an event filter executing within the respective virtual machine, and an introspection engine executing outside of the respective virtual machine, for instance at the level of a hypervisor or in a separate virtual machine. The processor may be configured to generate a virtualization exception in response to detecting an attempt to access memory in a manner which violates an access permission. Some embodiments register the event filter component as a handler for virtualization exceptions.

Computer security is enforced by setting access permissions to sections of memory which store data belonging to protected objects. An attempt to access any of the protected memory sections in a manner which violates the respective access permission triggers a virtualization exception, and is therefore detected by the event filter. In some embodiments, the event filter filters the detected memory access attempts according to a set of eligibility criteria, to select a subset of access attempts deemed suspicious or malware-indicative. Exemplary eligible events may include, for instance, an attempt to overwrite a page table entry used to perform memory address translation for a process executing within the virtual machine. Events deemed eligible are notified to the introspection engine executing outside the protected virtual machine, for instance via hypercalls. The introspection engine may analyze notified events to determine whether they indicate a malicious attack.

In general, software components executing outside a virtual machine are substantially less vulnerable to malicious software executing within the VM than components executing inside the respective VM. Therefore, from a security viewpoint, it may be advantageous to place important security components outside a protected VM. However, communicating data and/or signaling the occurrence of a security-relevant event to a component executing outside the respective VM typically requires a VM exit, which is relatively costly in terms of computational resources.

Conventional computer security software is typically placed either completely inside or completely outside a protected virtual machine. In contrast to such systems, some embodiments of the present invention comprise a hybrid configuration, wherein one component (event filter) executes within, while another component (introspection engine) executes outside the protected VM. Event detection is performed by the inside component, while the bulk of the analysis of the to intercepted event is performed by the outside component. Such configurations may achieve a balance between security and speed, thus improving the user experience without compromising on security. To further increase security, some embodiments minimize the size and complexity of the inside component. In a preferred embodiment, the event filter only acts as a filter to select a subset of events for notification to the introspection engine. Such a lightweight component may be relatively easily injected into the protected VM without knowledge of the operating system or of malicious software executing within the VM. More sophisticated event analysis may then be carried out by the outside component, i.e., introspection engine.

Some embodiments of the present invention rely on the observation that not all events detected during execution of guest software warrant the expense of a VM exit. For instance, since memory access permissions may only be set with page granularity, protecting an item that occupies only a fraction of a memory page may inadvertently cause a vast number of permission violations by legitimate attempts to access other items hosted within the same memory page. In another example, not all modifications to a page table are suspicious; the operating system frequently make changes to control bits and addresses as part of legitimate memory management activities. Notifying legitimate events to security software unnecessarily consumes computational resources.

Some embodiments therefore employ the mechanism of virtualization exceptions as a filter to avoid unnecessary VM exits. The filter operates with specific eligibility criteria for determining whether an event should be notified outside the VM or not. For instance, the event filter executing within the protected VM may analyze each detected memory access violation and determine whether it is actually caused by an attempt to access a protected item, as opposed to an attempt to access other data stored within the same page. When trying to protect page tables, the event filter may check whether an attempted modification targets a specific items, e.g., a certain control bit. The filter may then communicate only eligible events to the memory introspection engine.

Applications of some embodiments of the present invention may extend well beyond the field of computer security. By avoiding a substantial proportion of VM exit events, the event filter may in general accelerate the operation of hardware virtualization platforms. The criteria for selecting which in-VM events get processed internally (or ignored) and which events are notified outside may be tuned to achieve a desired optimization.

It will be clear to a skilled artisan that the above embodiments may be altered in many ways without departing from the scope of the invention. Accordingly, the scope of the invention should be determined by the following claims and their legal equivalents.

What is claimed is:

1. A host system comprising a hardware processor and a memory, the hardware processor configured to execute a virtual machine (VM), an event filter, and an introspection engine, the event filter executing within the VM, the introspection engine executing outside of the VM, the hardware processor further configured to:
   generate an exception in response to detecting an attempt by a software entity executing within the VM to access a memory page in a manner which violates a memory access permission; and
   in response to the exception, switch from executing the software entity to executing the event filter;
   wherein the event filter is configured to:
      in response to the exception, determine whether the memory page stores at least a part of a page table used by the hardware processor to perform memory address translations for the VM,
      in response to determining whether the memory page stores at least the part of the page table, when yes, determine whether the attempt comprises writing to a field of a page table entry of the page table, the field selected from a group consisting of a control bit and an address field,
      in response to determining whether the attempt comprises writing to the field, when yes, trigger a VM exit event causing the hardware processor to suspend execution of the VM and to switch to executing the introspection engine, and
      in response to determining whether the attempt comprises writing to the field, when no, cause the hardware processor to resume executing the software entity without triggering the VM exit event;
   and wherein the introspection engine is configured to determine whether the attempt is malicious in response to the VM exit event.

2. The host system of claim 1, wherein the attempt comprises overwriting a value of the control bit.

3. The host system of claim 1, wherein the attempt comprises overwriting a value of the address field.

4. The host system of claim 1, wherein determining whether the attempt is malicious comprises:
   employing the introspection engine to determine whether the attempt was performed by a component of an operating system executing within the virtual machine; and
   in response, when the attempt was performed by the component of the operating system, determining that the attempt is not malicious.

5. The host system of claim 1, wherein the introspection engine is further configured, in preparation for execution of the event filter, to inject the event filter into another software entity executing within the VM, wherein injecting the event filter comprises writing at least a part of the event filter to a section of the memory currently allocated for the other software entity.

6. The host system of claim 5, wherein the other software entity is a driver of an operating system of the VM.

7. The host system of claim 1, wherein the event filter is further configured to:
   assemble a roster of protected memory sections, the roster including, for each protected memory section, an address of the each protected memory section and an indicator of a type of asset stored within the each protected memory section; and
   determine whether the memory page stores at least the part of the page table according to the roster.

8. The host system of claim 1, wherein the event filter is further configured, in response to determining whether the memory page stores at least the part of the page table, when no, to cause the hardware processor to resume executing the software entity without triggering the VM exit event.

9. A method of protecting a host system from computer security threats, wherein the host system comprises a hardware processor and a memory, the hardware processor configured to execute a virtual machine (VM), an event filter, and an introspection engine, the event filter executing within the VM, the introspection engine executing outside of the VM, the method comprising:
   configuring the hardware processor to generate an exception in response to detecting an attempt by a software entity executing within the VM to access a memory page in a manner which violates a memory access permission;
   configuring the hardware processor to switch, in response to the exception, from executing the software entity to executing the event filter;
   in response to the exception, employing the event filter to determine whether the memory page stores at least a part of a page table used by the hardware processor to perform memory address translations for the VM;
   in response to determining whether the memory page stores at least the part of the page table, when yes, employing the event filter to determine whether the attempt comprises writing to a field of a page table entry of the page table, the field selected from a group consisting of a control bit and an address field;
   in response to determining whether the attempt comprises writing to the field, when yes, triggering a VM exit event causing the hardware processor to suspend execution of the VM and to switch to executing the introspection engine;
   in response to determining whether the attempt comprises writing to the field, when no, causing the hardware processor to resume executing the software entity without triggering the VM exit event; and
   in response to the VM exit event, employing the introspection engine to determine whether the attempt is malicious.

10. The method of claim 9, wherein the attempt comprises overwriting a value of the control bit.

11. The method of claim 9, wherein the attempt comprises overwriting a value of the address field.

12. The method of claim 9, wherein determining whether the attempt is malicious comprises:
   employing the introspection engine to determine whether the attempt was performed by a component of an operating system executing within the virtual machine; and
   in response, when the attempt was performed by the component of the operating system, determining that the attempt is not malicious.

13. The method of claim 9, further comprising, in response to determining whether the memory page stores at least the part of the page table, when no, causing the hardware processor to resume executing the software entity without triggering the VM exit event.

14. A non-transitory computer-readable medium storing instructions which, when executed by a hardware processor of a host system exposing a virtual machine, cause the host system to form an event filter and an introspection engine, the event filter executing within the VM, the introspection engine executing outside of the VM, wherein:
   the introspection engine is configured to:
      configure the hardware processor to generate an exception in response to detecting an attempt by a software entity executing within the VM to access a memory page in a manner which violates a memory access permission,
      configure the hardware processor to switch, in response to the exception, from executing the software entity to executing the event filter,
      configure the hardware processor, in response to a VM exit event, to suspend execution of the VM and switch to executing the introspection engine, and
      in response to the VM exit event, determine whether the attempt is malicious; and
   wherein the event filter is configured to:
      in response to the exception, determine whether the memory page stores at least a part of a page table used by the hardware processor to perform memory address translations for the VM,
      in response to determining whether the memory page stores at least the part of the page table, when yes, determine whether the attempt comprises writing to a field of a page table entry of the page table, the field selected from a group consisting of a control bit and an address field,
      in response to determining whether the attempt comprises writing to the field, when no, trigger the VM exit event; and
      in response to determining whether in response to determining whether the attempt comprises writing to the field, when no, cause the hardware processor to resume executing the software entity without triggering the VM exit event.

15. The computer-readable medium of claim 14, wherein the attempt comprises overwriting a value of the control bit.

16. The computer-readable medium of claim 14, wherein the attempt comprises overwriting a value of the address field.

17. The computer-readable medium of claim 14, wherein determining whether the attempt is malicious comprises:
   employing the introspection engine to determine whether the attempt was performed by a component of an operating system executing within the virtual machine; and
   in response, when the attempt was performed by the component of the operating system, determining that the attempt is not malicious.

18. The computer-readable medium of claim 14, wherein the event filter is further configured, in response to determining whether the memory page stores at least the part of the page table, when no, to cause the hardware processor to resume executing the software entity without triggering the VM exit event.

* * * * *